(12) United States Patent
Auchmoody et al.

(10) Patent No.: US 10,353,818 B1
(45) Date of Patent: Jul. 16, 2019

(54) DATASET PAGING CACHE FOR STORAGE SYSTEM

(71) Applicant: EMC Corporation, Hopkinton, MA (US)

(72) Inventors: Scott C. Auchmoody, Irvine, CA (US); Orit Levin-Michael, Irvine, CA (US); Scott H. Ogata, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 484 days.

(21) Appl. No.: 13/779,177

(22) Filed: Feb. 27, 2013

(51) Int. Cl.
G06F 12/08 (2016.01)
G06F 12/0846 (2016.01)

(52) U.S. Cl.
CPC .......... *G06F 12/0851* (2013.01); *G06F 12/08* (2013.01)

(58) Field of Classification Search
CPC ....... G06F 12/08; G06F 12/06; G06F 12/0851
USPC .............................................. 711/1–211, 137
See application file for complete search history.

(56) References Cited

U.S. PATENT DOCUMENTS

| 6,427,190 | B1 | 7/2002 | Hansen | |
|---|---|---|---|---|
| 6,675,177 | B1* | 1/2004 | Webb | 707/999.2 |
| 6,928,526 | B1 | 8/2005 | Zhu et al. | |
| 7,512,635 | B1 | 3/2009 | Solin | |
| 7,636,824 | B1 | 12/2009 | Tormasov | |
| 8,392,384 | B1 | 3/2013 | Wu et al. | |
| 2003/0079087 | A1* | 4/2003 | Kuwata | 711/136 |
| 2008/0243879 | A1* | 10/2008 | Gokhale et al. | 707/100 |
| 2009/0037646 | A1 | 2/2009 | Molotchko et al. | |
| 2009/0112975 | A1 | 4/2009 | Beckman et al. | |
| 2012/0084518 | A1* | 4/2012 | Vijayan et al. | 711/162 |
| 2012/0166448 | A1* | 6/2012 | Li | G06F 17/30097 707/747 |
| 2012/0209814 | A1* | 8/2012 | Zhang | G06F 11/1458 707/654 |
| 2012/0254690 | A1 | 10/2012 | Resch et al. | |
| 2013/0080836 | A1 | 3/2013 | Stergiou | |
| 2013/0198401 | A1 | 8/2013 | van Doorn | |

* cited by examiner

*Primary Examiner* — Ann J Lo
*Assistant Examiner* — Jane Wei
(74) *Attorney, Agent, or Firm* — Krishnendu Gupta; Peter Jovanovic

(57) ABSTRACT

A method, article of manufacture, system and apparatus for reducing data transfer and backup duration using a client side dataset paging cache. Backups may be associated with given datasets. Loading the same dataset previous backups pages and champions into memory will improve backups performance.

16 Claims, 8 Drawing Sheets

US 10,353,818 B1

DATASET PAGING CACHE FOR STORAGE SYSTEM

CROSS REFERENCE TO RELATED APPLICATIONS

This application is related to co-pending U.S. patent application Ser. No. 13/779,127 for PAGING CACHE FOR STORAGE SYSTEM and filed concurrently herewith, which is incorporated herein by reference for all purposes.

FIELD OF THE INVENTION

This invention relates generally to backup and archiving systems, and more particularly to systems and methods for using a paging cache to reduce data transmission, server/client overhead, and backup times.

BACKGROUND OF THE INVENTION

System clients may periodically backup data to a remote location. This allows files on a given system to be restored in the event of a loss. Storing the data remotely further reduces the impact of environmental catastrophes, and may allow backups from multiple clients to be managed from a central location. Remote storage may, however, require unnecessary data transmission. For example, a client may query remote storage to determine if the storage already contains a piece of data. This query may increase network traffic, latency, server and client workloads, and increase backup duration. One approach to solving this issue is a client cache.

Client caches present their own problems, however. In recent years, disk size has doubled nearly every 18 months, while memory size has grown at a much slower rate. Further, the cost of additional memory can greatly exceed the cost of additional disk space. The exponential rate of disk growth and memory cost may make it difficult to load a backup cache into client memory since the cache on disk may exceed memory capacity. On large storage systems, the cache may start to miss and make unnecessary server queries, or require a memory upgrade. This trend may continue as long as disk size continues to outstrip memory growth.

There is a need, therefore, for an improved method, article of manufacture, and apparatus for managing a client cache in backup systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
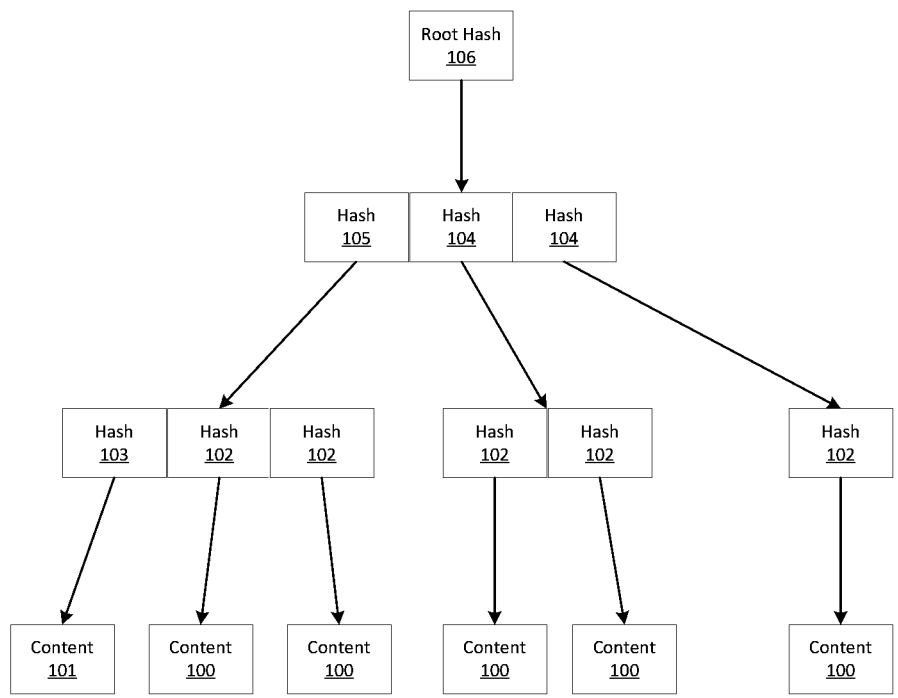
FIG. 1 illustrates a Merkle tree in accordance with some embodiments of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses a client paging cache to reduce queries from a primary storage system, such as a client machine, to a secondary storage system, such as a backup location. The primary storage system may use the cache to identify information that has already been transferred, thereby eliminating a need to check if that data is already on the backup server. In an embodiment, the cache resides on the primary storage system and is loaded into memory during the backup process.

In an embodiment, a backup may be divided into data objects or blocks, and hash signatures for these objects or blocks may be derived. During the backup process, these hashes may be written to pages which may be stored to disk when they are full. The next time the backup process runs, the pages may be loaded into memory and the stored hash signatures may be compared to the new signatures. In some embodiments, one of a plurality of stored hash signatures may be compared to a single new signature. Additionally or alternatively, a stored single hash signature may be compared to one of multiple new signatures. When there is a match, the associated data has already been transmitted. The client therefore may not need to verify the data's existence on the secondary storage system. In an embodiment, when there is a match only a data reference is transmitted to the secondary storage system. If there is a miss, it may be because the data has not been backed up and should be transmitted to the secondary storage system. In an embodiment, prior to transmission the backup server may be queried to verify the data does not exist.

Turning now to FIG. 1, the structure of a data backup consistent with an embodiment of the present disclosure is discussed. In an embodiment, individual backups are stored in content addressable storage using Merkle trees. Content 100, 101 may be content backed up to a secondary storage location. In an embodiment, content 100, 101 may be individual files or chunks of data. Content 100, 101 may be hashed into hashes 102, 103 which may in turn be concatenated together to form hashes 104, 105. Hashes 104, 105 may be concatenated and hashed to form root hash 106, which is a hash representing the entire backup. If any of the content changes between backups, root hash 106 will also be changed and the intermediate hashes may be used to identify the content location. For example, if content 101 is modified between backups, hashes 103, 105, and 106 will also change.

While FIG. 1 uses like numerals to designate some hashes and content, this does not imply that the hash values or the content values are the same. The numerals are used for ease of illustration, and to identify content as content and hashes as hashes. The designations have no impact on hash or content value.

Figure 2:
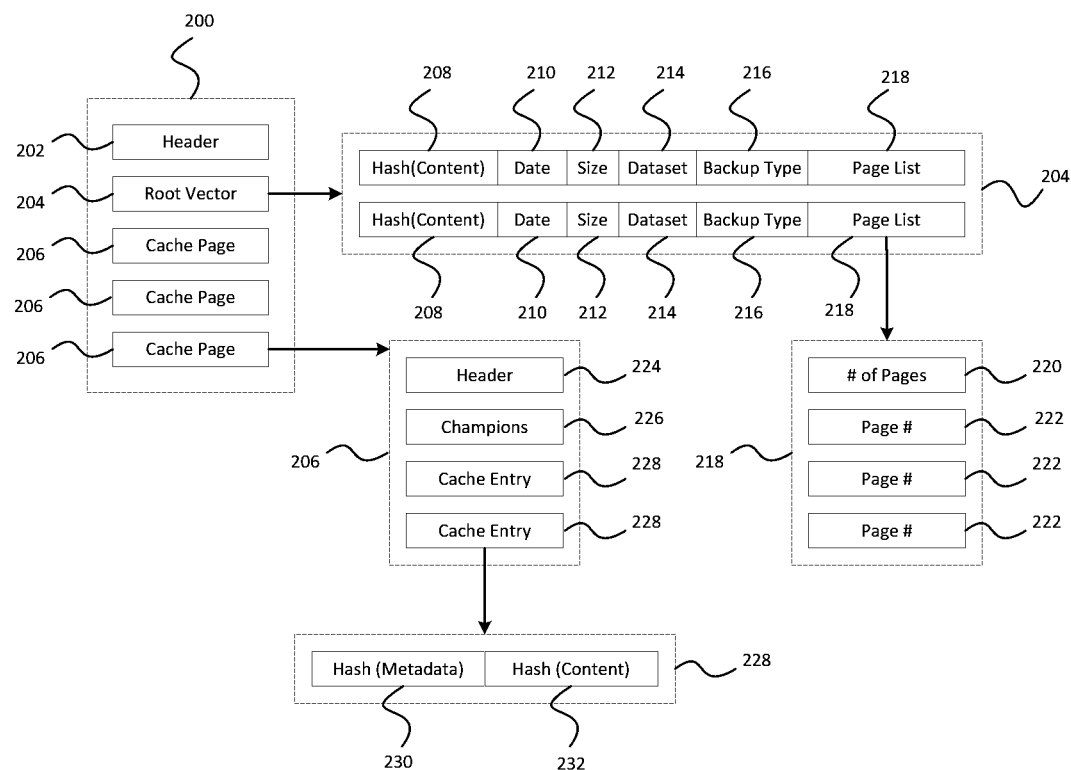
FIG. 2 is a cache architecture in accordance with some embodiments of the present disclosure.

With reference to FIG. 2, a structure for a primary storage paging cache is described. Paging cache 200 may be stored on the disk of a primary storage device, such as a client machine. In an embodiment, paging cache 200 comprises header 202, root vector 204, and cache pages 206. While only three cache pages are shown, any number of pages may be used.

At the start of the backup process, the header of paging cache 200 may be loaded from disk into memory. A hash signature may be derived from paging cache 200 and validated against a checksum that was stored in header 202 at the completion of a previous backup process. If there is a match, the backup may continue using the cache. If there is a mismatch, paging cache 200 may be corrupt and the backup process may continue without using the cache.

Root vector 204 may comprise a list of backups on the secondary storage system (i.e. the target). Each list may include hash 208, date 210, size 212, dataset 214, backup type 216, and page list 218. In an embodiment, hash 208 is a hash of the previous backup content. There may be one root vector entry for each previous backup. For example, in FIG. 2 there are two backups, although this is for illustrative purposes and root vector 204 may comprise any number of entries. In an embodiment, hash 208 may be the root hash of a Merkel tree, such as root hash 106. Date 210 may be a time stamp representing the initiation or completion of the previous backup, and size 212 may be the total backup size. In an embodiment, different backup may belong to datasets, as discussed below, and a dataset identifier may be stored in dataset 214. Backup type 216 may record whether the previous backup's type (e.g. file system, application, database, etc), and page list 218 may represent the pages associated with the previous backup.

Page list 218 references to a plurality of pages created during the previous backup. Throughout the backup process, at least one write page may be resident in memory. In an embodiment, signatures are derived for each file, object, block, or chunk of data before they are transmitted to secondary storage (described in further detail below). These signatures may be written to the write page, which is in turn written to disk on the primary storage when the write page is full. A new write page may subsequently be loaded into memory and the process may repeat itself until the backup is complete.

Page list 218 may reference the write pages created during a previous backup. Number of pages 220 may include the total number of pages from the previous backup. For example, in FIG. 2 number of pages 220 would be equal to three, however this is for illustrative purposes and any number of pages may be included in page list 218. Page number 222 may be a reference or pointer to cache pages 206, or in an embodiment may be the pages themselves.

Individual cache pages 206 may comprise header 224, champion list 226, and cache entries 228. In an embodiment, header 224 may include a checksum for all or a portion of the page, where the checksum was calculated before the page was written to the primary storage. During the backup process when cache page 206 is loaded into memory, the checksum may be recalculated and validated against the checksum in the header. If there is a match, the backup may continue using the cache page. If there is not a match, the cache page may be corrupt and discarded, and the process may continue without using that page.

Champion list 226 may comprise a sampling of all the cache entries on a given page. This could be, for example, thought of as an index for that page. As will be described in detail below, champion list 226 may allow cache pages with particular entries to be quickly identified, even if those pages are not presently loaded into memory. In an embodiment, champion list 226 comprises a sampling of cache entries 228, and the sampling may be evenly distributed throughout the page. For example, the champions may comprise cache entries on the page having a defined number of binary zeros or ones from the least or most significant bit. This may result in a sampling ratio of $2^n$, where n is the number of ones/zeros measured. For example, if n is set to eight, then only hashes ending in at least eight zeros may be selected (i.e. 1:256).

Cache entries 228 may comprise unique signatures for the file, object, block, or chunk of data being backed up. In an embodiment, cache entries may comprise metadata hash 230 and content hash 232. Metadata hash 230 may be acquired by concatenating and hashing a data object's metadata. This metadata could include, for example, file name, path, modification time, creation time, etc. Additionally or alternatively, metadata hash may be used to reference entries stored within a traditional file system. For example, the left side of the cache entry may be a metadata hash, while the right side may reference a container id, offset, and/or length. Content hash 232 may comprise a hash of the content associated with the metadata. For example, if the metadata identifies a particular file, block, or chunk of data, content hash 232 may be a hash of that data.

In an embodiment, cache entries 228 may comprise a hash of the contents of a data object or stream rather than metadata hash 230. For example, a data object or stream may be broken into variable length chunks using a rolling hash, such as Rabin Fingerprints. Additionally or alternatively, a hash of the content itself may be taken without breaking up a data object. If the secondary storage system comprises content addressable storage, the cache entry may not need any additional information. If the secondary storage system is a traditional file system, the content hash may form the left-hand side of a lookup table while the right-hand side refers to the container id, offset, and/or length.

Figure 3:
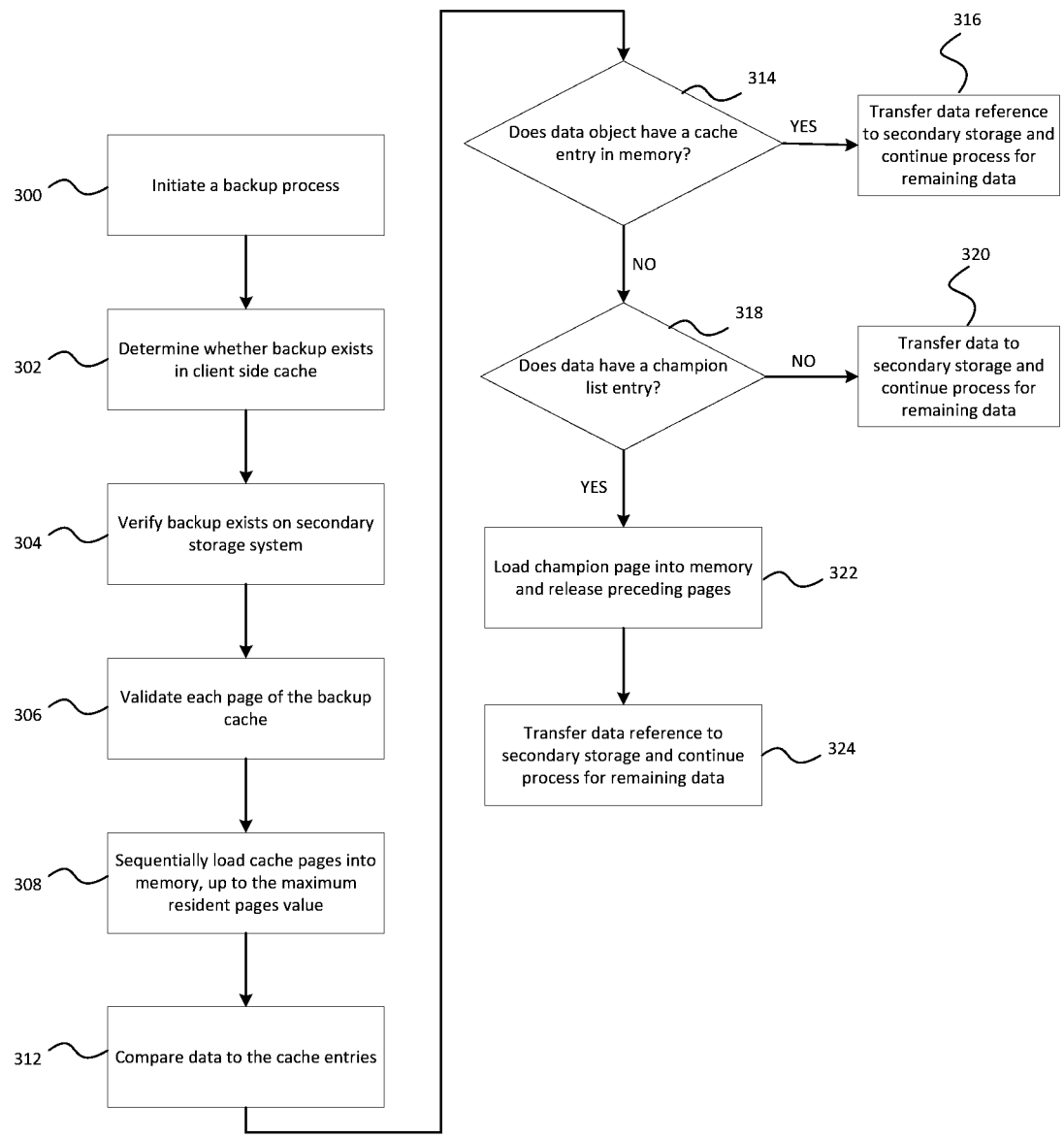
FIG. 3 is a flowchart of a method for backing up data using a primary storage cache in accordance with some embodiments of the present disclosure.

Turning now to FIG. 3, a flowchart depicting a process for using a paging cache will be discussed. At 300 a backup process is initiated on a primary storage system. This system could be, for example, a client computer such as a laptop, workstation, server, tablet, phone, etc. At 302 a check is made to determine whether the backup exists in the client side cache. In a content addressable storage system, this could be done by deriving a root hash and searching for the hash in a root vector. If the backup has not been cached, the process may proceed without using a cache. Additionally or alternatively, the cache may be formed from other backups.

At 304, the process verifies that the backup still exists on the secondary storage system. For example, if the secondary storage comprises a content addressable storage, the verification may be performed by verifying the backup's root hash exists on the secondary storage system. Additionally or alternatively, if the secondary storage system comprises a traditional or network file system ("NFS"), the process may verify the container exists on the secondary system. In an embodiment, once the backup has been validated all of the pages referenced in the page list may be marked as valid and ready for use.

At block 306, individual pages of the backup cache may be verified. This verification could, for example, comprise calculating a hash of the page and comparing the hash to a checksum in the pages header. This validation may occur en masse before the cache is used, or on an individual basis as each page is loaded into memory. In an embodiment, the checksum is calculated when the page is first created before it is written to disk. If there is a mismatch between the calculated hash and a page's checksum, the page may be discarded and removed from every backup list.

At 308, the cache pages are sequentially loaded into memory up to a defined maximum resident pages value (i.e. window). For example, the previous backup's cache may include twenty pages and the window may be set to five pages. In such an embodiment, only five cache pages may be resident in memory at any given time. Once the first five pages have been processed, the oldest page may be released from memory and the next page in the sequence may be loaded. Additionally or alternatively, pages are released as soon as they have been individually processed, rather than waiting for the entire window to finish. For example, as soon as the first page is processed it may be removed and the sixth page may be loaded. In some embodiments, the point of reference (i.e. the page being processed) may be a middle page. Once the point of reference is processed the oldest page in memory may be released. This may provide performance benefits, as discussed below.

In an embodiment, the page window may be dynamic based on available client resources. Additionally or alternatively, the page window may be defined by a user or a system administrator. In some embodiments, the window may be both dynamic and defined. For example, the window may dynamically load as many pages into memory as possible up to a user defined maximum. In an embodiment, the window size may be optimized based on available memory size and/or workload behavior, and may have a guaranteed minimum size. Additionally or alternatively, the page window may be impacted by the size of the champion list. For example, if the champion list is small, the window size may be increased. Similarly, a champion list's parameters may also vary dynamically based on window size and available resources. In some embodiments, the parameters may be determined based on user preferences. For example, a user may prefer to load more pages and fewer champions, and may therefore restrict the number of champion loaded into memory.

In some embodiments, a page window may not be used. For example, a previous backup may have a cache small enough that all of the pages fit into memory, and therefore the window may not be needed. Additionally or alternatively, a given dataset may be small enough to load all the associated pages into memory. In some embodiments, neither a page window nor a champion list is used. For example, if all the pages are memory resident false misses may not occur, and therefore the champion list may not be necessary.

In some embodiments, the pages are sequentially loaded into memory. This may produce performance benefits since backup processes tend to traverse the file system in the same order each time they run. As a result, the order of data objects may not change significantly between backups. Further, the hashes of nearby data objects should reside on the same or nearby pages. This is particularly beneficial when multiple pages reside in memory and the point of reference for a page window is in the middle.

In an embodiment, the cache entries are stored in hash tables on the pages. These hash tables may use, for example, open hashing with linear probing. Open hashing may produce lookup times of with O(1) per page, and O(n) total, where n is the number of pages resident in memory. This may be particularly beneficial when the point of reference in a window is a middle page, or when the cache is stored on multiple pages, some of which are resident in memory and some of which are not.

At 312, individual files, objects, blocks, or chunks of data are compared to the cache entries listed on the memory resident pages. For example, if the cache entries are metadata hashes mapping to content hashes, as shown in cache entry 228 in FIG. 2, the metadata for each object may be concatenated, hashed, and compared to the cache entries on the memory resident pages. Since the pages are sequentially loaded and the backup process may traverse the primary storage system in the same order each time it runs, cache hits should occur in a fairly sequential order. For example, the first object backed-up by a previous process will likely be the first object backed-up by the present process, and therefore should be stored on an earlier sequential page. This may significantly reduce processing time because the next needed signature may reside in memory at the same time as the signature for nearby objects.

At 314, the process determines whether there has been a hit. If the present backup data object has a cache entry in memory, it means that data file, object, block, or chunk has already been transmitted to the secondary storage system. As a result, at 316 the process may transmit only a reference to the data. This reference could, for example, comprise the hash signature stored in the cache entry. The secondary storage system may retain this reference for backup recovery. For example, if in the future the primary storage system needs to restore the present backup, the secondary storage system may use the reference to retrieve the associated data and return the data to the primary storage system. In an embodiment, this may result in the primary storage system only transmitting data to the secondary system one time. After the initial transfer, only the data reference needs to be sent.

Although a backup process may traverse the primary storage system in substantially the same order each time it runs, there may nevertheless be occasional false misses (i.e. a cache miss when the entry actually exists in cache). For example, a large data object may be deleted from the primary storage system. As a result, a large number of the cache signatures may be obsolete. Occasionally, the number of obsolete pages will extend past the cache pages currently residing in memory. For example, a primary storage cache may comprise pages A, B, C, D, E, F, G and H. Cache pages A, B and C may be memory resident. A large directory may span pages C, D and E, and the next sequential data object may be cached on page F. If the large directory is deleted from the primary storage system, the cache may miss since pages A, B, and C are in memory, but the next relevant entry is on page F. Searching the entire cache for the entry may not be an efficient use of resources because the system does not know which page, if any, the next entry is written to. The champion list may resolve this issue.

As noted above in reference to FIG. 2, each cache page may have a champion list comprising a sampling of the entries on the page. When the backup process is initiated or as the pages are validated, the champion list for each page may be loaded into memory and retained throughout the process. When check 314 results in a miss, the champion list may be queried at 318 to determine if there is a hit. If there is not a hit in the champion list, the client may query the secondary storage to determine if the secondary storage has the data reference. If the data reference is not found, the content may be transmitted to the secondary storage. Additionally or alternatively, the process may assume there is no previous backup of the data object, and both the content and the reference may be transmitted to secondary storage at 320. If there is a hit on the champion list, at 322 the page with the corresponding entry may be loaded into memory and any preceding pages may be released.

In some embodiments, champion lists from a backup associated with the present dataset may be loaded into memory. Additionally or alternatively, the champion lists from other backups may be loaded into memory. For example, when a new dataset is created the champion list from previous backups may be loaded into memory.

For example, after the large directory has been deleted in the example above, the champion list for page F may return a hit for the next sequential data object. Pages A, B, C, D, and E may be removed from memory, and pages F, G, and H may be loaded to fill the window. This may be beneficial because, assuming the backups are sequential, the next relevant cache entries likely follow the next sequential data object, and therefore are likely written to pages F, G, and H. In some embodiments, pages surrounding the page with the associated champion hit are loaded into memory. Specific pages, chosen based on their location relative to the last hit before current champion hit, may be removed from memory. Additionally or alternatively, only the page with the associated champion hit is loaded into memory (e.g. page F is loaded into memory).

As noted above in reference to FIG. 2, the champion list may comprise a sampling of cache entries evenly distributed throughout the page. This even distribution may improve cache performance by providing an estimate of how many misses may occur before a champion hit. This helps to identify the right ratio between page window and champion list size, thereby increasing the probability of a cache hit. For at least this reason, forming the champion list from an even distribution of cache entries may improve the cache performance.

The champion list may be further utilized to ensure cache entries for important or large files are always resident in memory. As noted above, the champion list comprises a sampling of the entries on a given page. As a result, there is a chance that the cache will miss even when there is a relevant entry because that entry may not be on a page currently residing in memory or on the champion list. For example, if the sampling is taken by including every cache entry with ending in at least eight binary zeros, the sampling ratio will be $2^n$ where n equals eight, or 1:256. In other words, one out of every 256 cache entries will be champions. As should be apparent, even utilizing a champion list there is still a risk for a cache miss since 255 out of 256 entries will not be included on the list.

The negative impact of a cache miss may be greater for important or large data objects. For example, a miss for a large unchanging DVD iso file may result in significant overhead because the resources required to backup this data may be great. In other words, the cost of a cache miss rises with the data object size. To help alleviate this cost, a champion for a large file may always be entered into a page's champion list, which may be loaded into memory. Additionally or alternatively, a champion list comprising only champions for large data objects may be stored on the pages. Entries for these large files may therefore always be found, even if the primary storage system adds/deletes a large amount of data and the files are not selected by the champion sampling process.

In an embodiment, a user may define which data objects always reside on the champion list. Additionally or alternatively, a size threshold may be defined. Any data object exceeding the defined threshold may automatically be added to the champion list. In an embodiment the threshold may be changed regularly up and down based on the backup characteristics and the available memory Finally, at 324 a data reference for the champion list match may be transferred to the secondary storage system. The backup process may thereafter continue for the remaining data in the system until the backup is complete.

Figure 4:
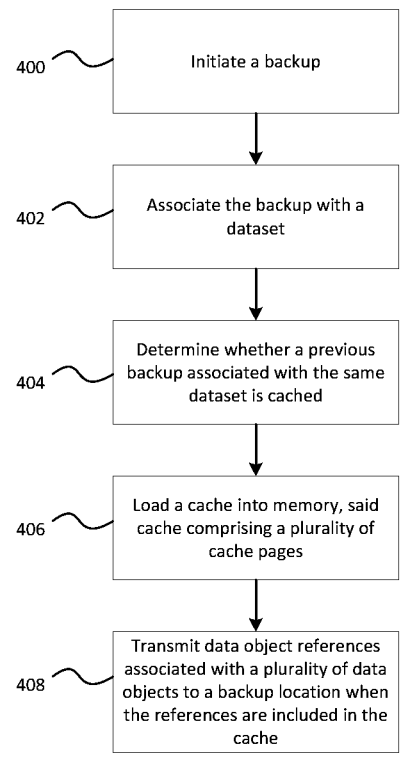
FIG. 4 is a flowchart of a method for cache datasets consistent with an embodiment of the present disclosure.
Figure 5:
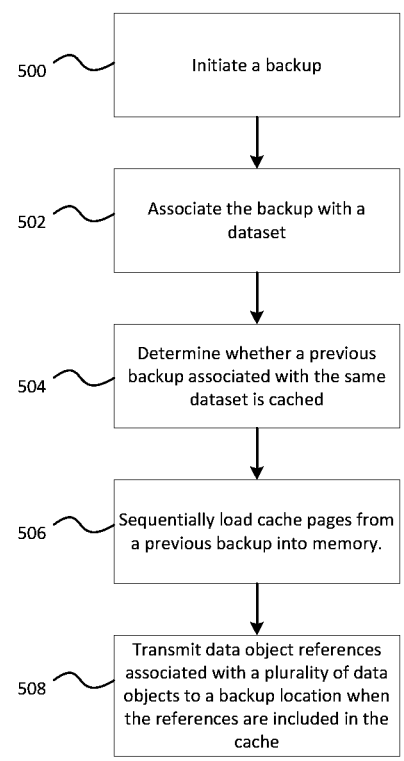
FIG. 5 is a flowchart for using another backup's cache consistent with an embodiment of the present disclosure.
Figure 6:
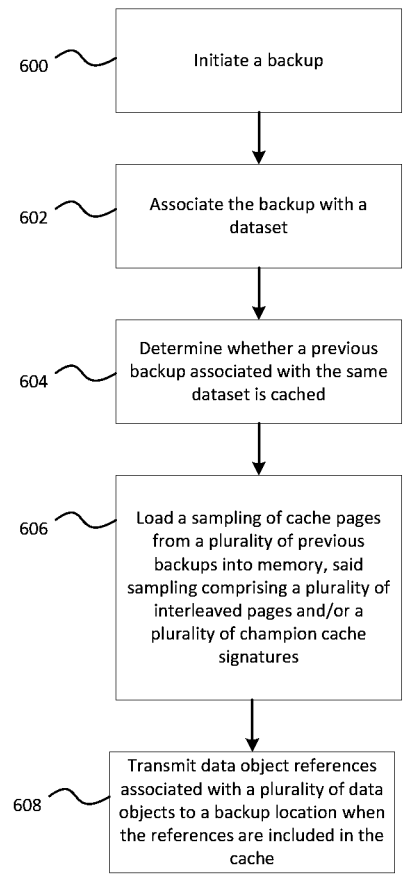
FIG. 6 is a flowchart for using a plurality of caches from unrelated backups consistent with an embodiment of the present disclosure.

FIGS. 4-6 depict methods for creating backups based on datasets. At 400, 500, 600 a backup is initiated, and at 402, 502, 602 the backup is associated with a dataset. Individual datasets may define a set of objects belonging to one or more backups. For example, a dataset may be defined to cover a specific directory on a hard drive or a given set of database files. Additionally or alternatively, datasets may be a collection of machines, backup-parameters, and/or includes/ excludes for a particular set of plug-ins. A backup which includes those objects may be associated with the dataset.

At 404, 504, and 604 a check is made to determine whether any previous backups are associated with the same dataset. If the result is positive, that backup's cache may be relevant to the present backup since they both cover the same or similar objects. In an embodiment, the results of this check may determine how the cache is loaded into memory. A backup derived from a given dataset may contain 99.7% of the same data, and using the backup's cache may therefore result in significant resource savings.

At 406, a cache may be loaded into memory in a manner substantially similar to that discussed above. In an embodiment, this may be the sampling of entire cache for every backup that has run on the system. This may be beneficial, for example, if there is no previous backup associated with the same dataset as the present backup. The system may therefore load the entire cache in an effort to locate relevant entries.

At 506, cache pages from a previous backup associated with the dataset are loaded into memory. This may be beneficial if system includes multiple datasets that are backed-up at different times. For example, dataset X may be backed up once, and then dataset Y may be backed up multiple times. Loading the cache into memory based on recent activity may therefore load the pages for a backup of dataset Y, even if the present backup only covers dataset X. Block 506 may instead load pages belonging to the initial (or any subsequent) backup of dataset X, thereby realizing the performance benefits discussed above without the overhead of dataset Y.

In some embodiments, multiple backups belonging to the same dataset may exist in cache. For example, dataset X may have been backed up three days ago, two days ago, and one day ago. A backup for dataset X today may therefore load the pages from yesterday's backup into memory. Additionally or alternatively, the backup may load the champion lists from a specific number of previous backups into memory. In an embodiment, the backup may load the champion lists from all the previous backups into memory.

At 606, a sampling of cache pages from a plurality of previous backups is loaded into memory. This embodiment may be helpful if the dataset does not have any associated backups in cache and/or has not already been backed up. In an embodiment, pages from previous backups associated with other datasets may be selected and interleaved with one another. Interleaving and sequentially loading the pages may preserve the order of the cache entries, and therefore improve performance as discussed above. For example, all of the first pages may be processed before all of the second pages.

Additionally or alternatively, the champion lists for all or some of the previous backups in the system may be loaded into memory. The present backup may thereafter use these champions to load relevant pages into memory. This embodiment may be particularly beneficial if there is overlap between datasets.

For example, a client may backup dataset X and then dataset Y, thereby creating a set of cache pages for each backup. A new backup may attempt to backup dataset Z, which may include portions of dataset X and Y, but does not yet have a cache. The present backup of dataset Z may therefore load the pages from the previous backups of datasets X and Y into memory. These pages could be loaded, for example, by interleaved with one another and/or when their champions hit.

Finally, at 408, 508, 608 data object references may be transmitted to a secondary storage system when there is a cache hit. If there is a miss, the secondary storage system may be queried for the reference and/or the entire data object may be transferred to the secondary storage system with or without an accompanying reference.

Figure 7:
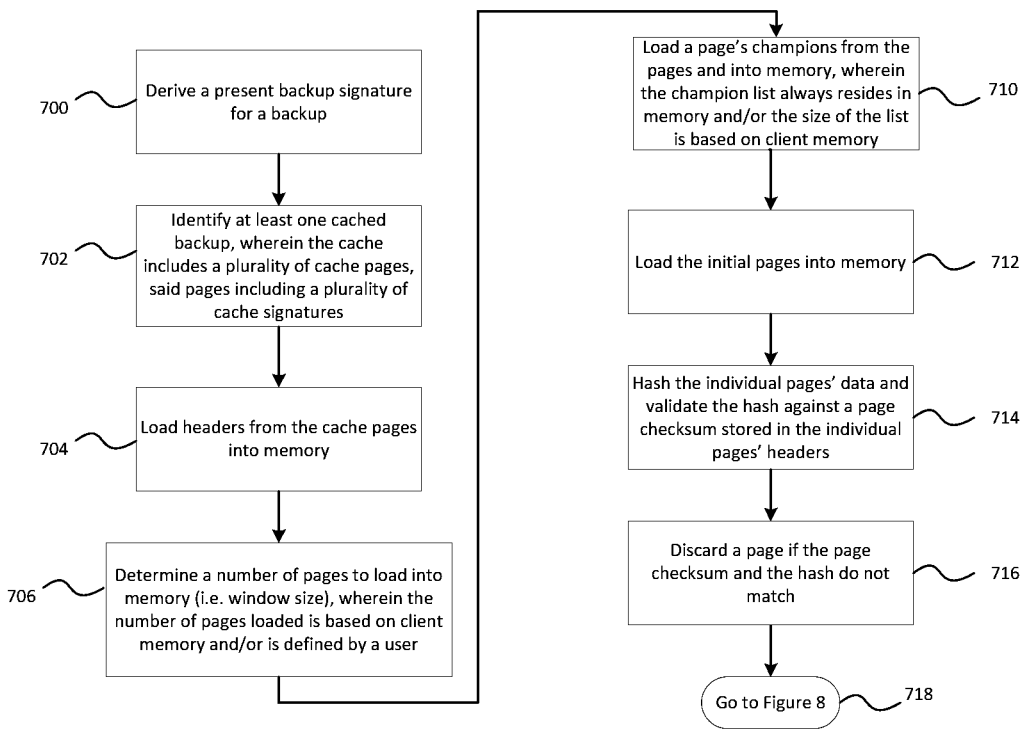
FIG. 7 is a flowchart of a method for using a paging cache consistent with an embodiment of the present disclosure.
Figure 8:
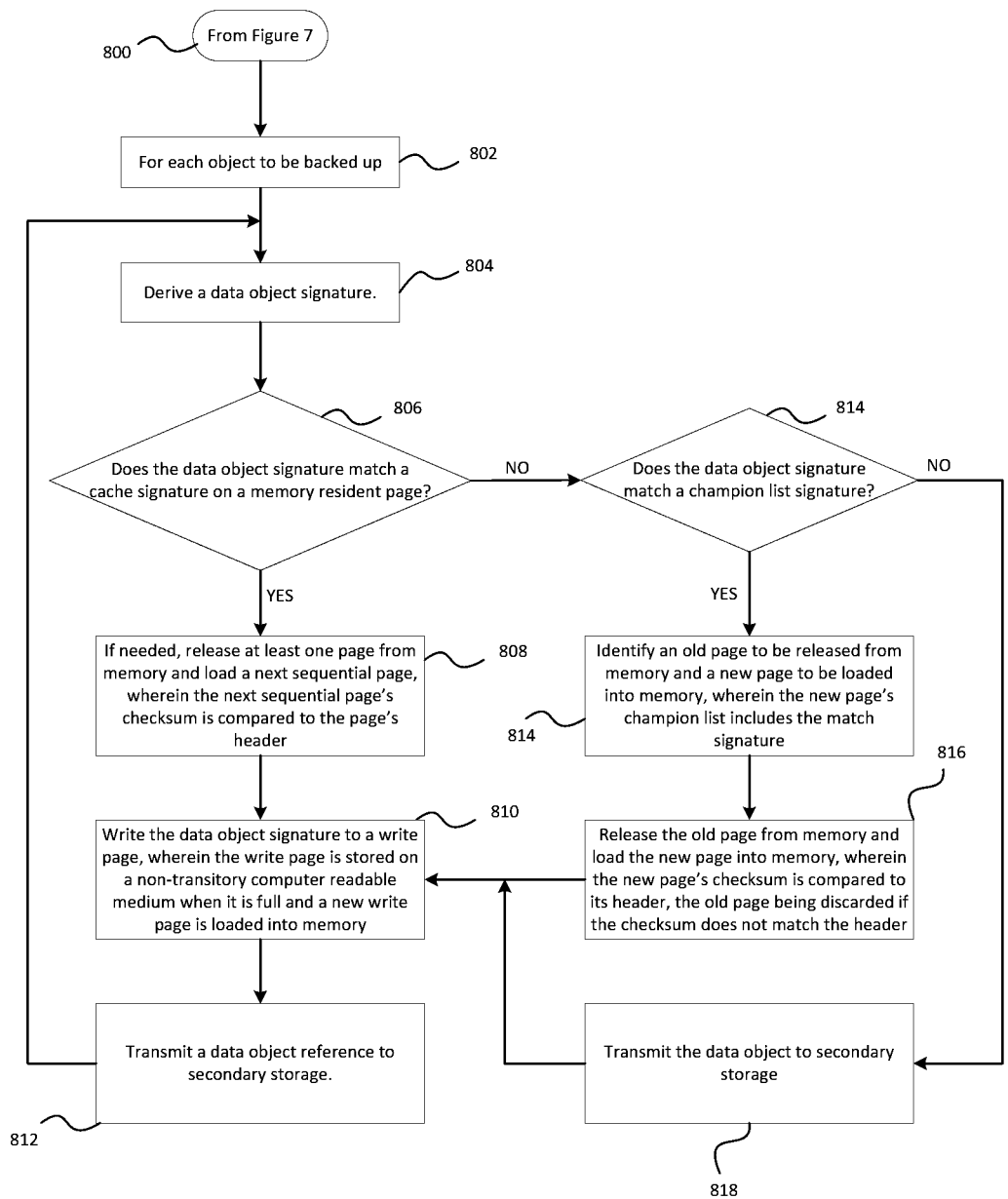
FIG. 8 is a continuation of the flowchart shown in FIG. 7 consistent with an embodiment of the present disclosure.

Turning now to FIGS. 7 and 8, a high level flowchart consistent with an embodiment of the present disclosure is discussed. At 700, a signature is derived for the present backup.

At 702, the cache is checked to identify at least one cached backup. In an embodiment, the cached backup may comprise a plurality of pages, such as cache pages 206 in FIG. 2. Additionally or alternatively, multiple backups with the same dataset may be identified, such as dataset 214 in FIG. 2 and discussed in reference to FIGS. 4-6. In some embodiments, multiple backups from different datasets may be identified. This may be particularly beneficial if the present dataset is new. The pages may further comprise a plurality of cache signatures, such as cache signatures 228 shown in FIG. 2.

At 704, the headers from the pages in the identified cached backups are loaded into memory. These headers could be, for example, header 224 in FIG. 2.

At 706, a window size may be calculated. This window size may be determined as discussed above in reference to FIG. 3. In some embodiments, the number of pages in the window may be based on available client memory and/or may be defined by a user.

At 710, the champion lists, such as champion lists 226, may be loaded from the pages and into memory. In some embodiments, the entire champion list for each page resides in memory. Alternatively, the number of champions loaded may be based on available client memory and/or defined by a user.

At 712, the initial sequential pages are the pages are sequentially loaded into memory. The number of initial pages may be equal to the window size determined in block 706.

At 714, a hash may be taken of the individual page's data as they are loaded into memory. This hash may be validated against a checksum stored in the pages header, such as header 224.

At 716, a page may be discarded if the validation in block 714 fails. Validation and discard blocks 714 and 716 may be substantially similar to block 306 discussed in reference to FIG. 3.

At 718, the process continues to FIG. 8. Similarly, at 800 the process continues from FIG. 7.

At 802, the process iterates over each data object to be backed up, and at 804 a signature is derived for each data object. This signature could, for example, comprise a hash of the data object metadata.

At 806, a check is made to determine whether the data object signature matches a cache signature on a memory resident page. If the check is positive, the process continues to block 808. If the check is negative, the process continues to block 814.

At 808, if needed, at least one page is released from memory and a next page is loaded. This may be similar to the loading/unloading discussed in reference to block 308 of FIG. 3. In some embodiments, validation similar to the check made at block 716 is performed on the new pages, and the pages are discarded if the validation fails.

At 810, the data object signature and/or signatures may be written to a write page, and the write page may be stored on a non-transitory computer readable medium when it is full. After storage, a new write page may be loaded and the process may continue. This may be substantially similar to the write page discussed in reference to element 218 of FIG. 2.

At 812, the data reference may be transmitted to a secondary storage system, and the process may thereafter continue to the next data object. This may be similar to blocks 316 and 324 of FIG. 3.

If the check at 806 fails, a second check may be made at 814 to determine if the data object signature matches a champion list signature. If the result is positive, the process continues to block 814. If it is negative, the process continues to block 818. This may be similar to check 318 discussed in reference to FIG. 3.

At 814, an old page may be identified to be released from memory and a new page containing the champion match may be located. This may be similar to block 322 of FIG. 3.

At 816, the page may be released and the new page may be loaded. The pages may be validated in a manner similar to that discussed in block 716, and the process may thereafter continue to block 810.

If the check at block 814 fails, the data object may not already be located on the secondary storage. At block 818, the data object may be transmitted to secondary storage the process may continue to block 810. In some embodiments, this may be substantially similar to block 320 discussed in reference to FIG. 3.

Throughout the present disclosure reference is made to "hashes." Any hash algorithm may be used to practice the described subject matter, and in an embodiment is a secure digest resistant to hash collisions. In some embodiments, a SHA1 function may be used.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for backing up a dataset, the method comprising:
   initiating a backup;
   associating the backup with the dataset;
   determining whether a previous backup associated with the same dataset is cached;
   sequentially loading a plurality of cache pages from a storage into a cache memory;
   transmitting data object references associated with a plurality of data objects to a backup location when the data object references are included in the cache.

2. The method of claim 1, wherein individual cache pages in the plurality of cache pages comprise cache signatures.

3. The method of claim 1, further comprising loading a sampling of cache pages from a plurality of previous backups into memory.

4. The method of claim 3, wherein the sampling comprises a plurality of interleaved pages selected from the plurality of previous backups.

5. The method of claim 3, wherein the sampling comprises a champion list including a plurality of cache entries stored on at least one of the cache pages.

6. The method of claim 5, wherein the plurality of cache entries are evenly distributed throughout individual cache pages.

7. A computer program product for backing up a dataset, comprising a non-transitory computer readable medium having program instructions embodied therein for:
   initiating a backup;
   associating the backup with the dataset;
   determining whether a previous backup associated with the same dataset is cached;
   sequentially loading a plurality of cache pages from a storage into a cache memory;
   transmitting data object references associated with a plurality of data objects to a backup location when the data object references are included in the cache.

8. The computer program product of claim 7, further comprising loading a sampling of cache pages from a plurality of previous backups into memory.

9. The computer program product of claim 8, wherein the sampling comprises a plurality of interleaved pages selected from the plurality of previous backups.

10. The computer program product of claim 8, wherein the sampling comprises a champion list including a plurality of cache entries stored on at least one of the cache pages.

11. The computer program product of claim 10, wherein the plurality of cache entries are evenly distributed throughout individual cache pages.

12. A system for backing up a dataset comprising a non-transitory computer readable medium and a processor configured to:
   initiate a backup;
   associate the backup with the dataset;
   determine whether a previous backup associated with the same dataset is cached;
   sequentially load a plurality of cache pages from a storage into a cache memory;
   transmit data object references associated with a plurality of data objects to a backup location when the data object references are included in the cache.

13. The system of claim 12, further comprising loading a sampling of cache pages from a plurality of previous backups into memory.

14. The system of claim 13, wherein the sampling comprises a plurality of interleaved pages selected from the plurality of previous backups.

15. The system of claim 13, wherein the sampling comprises a champion list including a plurality of cache entries stored on at least one of the cache pages.

16. The system of claim 15, wherein the plurality of cache entries are evenly distributed throughout individual cache pages.

* * * * *